United States Patent [19]

Dedolph

[11] Patent Number: 4,495,310

[45] Date of Patent: * Jan. 22, 1985

[54] METHOD OF FORMING A URETHANE PREPOLYMER AND ITS USE IN CONSOLIDATING AGGREGATE MATERIAL

[75] Inventor: Richard R. Dedolph, Naperville, Ill.

[73] Assignee: Gravi-Mechanics Co., Chicago, Ill.

[*] Notice: The portion of the term of this patent subsequent to May 11, 1999 has been disclaimed.

[21] Appl. No.: 493,378

[22] Filed: May 10, 1983

Related U.S. Application Data

[63] Continuation-in-part of Ser. No. 350,946, Feb. 22, 1982, Pat. No. 4,439,552, which is a continuation of Ser. No. 262,204, May 8, 1981, Pat. No. 4,329,436.

[51] Int. Cl.$^3$ ............................................. C08G 18/14
[52] U.S. Cl. ...................... 521/99; 210/728; 521/100; 521/101; 521/102; 521/159; 523/123; 523/129; 528/48; 528/76; 528/77; 528/80
[58] Field of Search ............... 521/159, 99, 100, 101, 521/102, 905; 210/728, DIG. 15; 523/123, 129; 528/48, 76, 77, 80, 83, 903, 904

[56] References Cited

U.S. PATENT DOCUMENTS

| | | | |
|---|---|---|---|
| 3,373,009 | 3/1968 | Pruitt et al. | 71/28 |
| 3,479,325 | 11/1969 | Blomeyer et al. | 528/903 |
| 3,723,393 | 3/1973 | Kistner | 528/904 |
| 3,805,531 | 4/1974 | Kistner | 61/36 R |
| 3,805,532 | 4/1974 | Kistner | 61/36 R |
| 3,812,619 | 5/1974 | Wood et al. | 47/58 |
| 3,814,736 | 6/1974 | Gibier-Ramband et al. | 528/903 |
| 4,127,515 | 11/1978 | MacRae et al. | 521/112 |
| 4,241,537 | 12/1980 | Wood | 47/77 |
| 4,329,436 | 5/1982 | Dedolph | 521/99 |

OTHER PUBLICATIONS

Wall, *Chem. Engr. Prog.*, 57, No. 10, 1961, pp. 48-51.

*Primary Examiner*—Maurice J. Welsh
*Attorney, Agent, or Firm*—Wood, Dalton, Phillips, Mason & Rowe

[57] ABSTRACT

A method of forming a urethane prepolymer comprising the steps of gradually adding an isocyanate compound to a hydrophilic polyether or polyester compound without substantial added mixing whereby a relatively dense isocyanate layer and a polyether or polyester layer overlying the isocyanate layer are formed, and a urethane prepolymer-forming reaction occurs at the interface between the layers. The resulting urethane prepolymer may be reacted with water to form a cellular urethane polymer, or with an aqueous slurry of unconsolidated aggregate material to form a consolidated aggregate product, such as a plant growth supporting rooting medium.

9 Claims, No Drawings

METHOD OF FORMING A URETHANE PREPOLYMER AND ITS USE IN CONSOLIDATING AGGREGATE MATERIAL

CROSS-REFERENCE TO RELATED APPLICATION

This is a continuation in part of copending, commonly assigned application Ser. No. 350,946 filed Feb. 22, 1982, now U.S. Pat. No. 4,439,552 issued Mar. 27, 1984, which in turn is a continuation of application Ser. No. 262,204 filed May 8, 1981, now U.S. Pat. No. 4,329,436 issued May 11, 1982.

BACKGROUND OF THE INVENTION

1. Field of the Invention

This invention relates generally to the field of urethane prepolymer formation and, more specifically, this invention relates to a method of forming a urethane prepolymer which exhibits improved capacity for binding aggregate material such as peat and for forming high quality foams.

2. Description of the Art

The use of various polymeric materials to provide support for aggregate material, such as the use of polymeric foam to form a matrix for plant growth-supporting nutrients, for example, is well known.

One form of polymeric matrix which has found wide acceptance in the soil consolidation art is polyurethane foam which comprises a polyether or polyester urethane formed by the process conventionally known as the "one-shot" process, or from a liquid urethane prepolymer which is reacted with an aqueous slurry of aggregate material.

In one form of the slurry reaction referred to above, a hydrophilic liquid urethane prepolymer which comprises an isocyanate-capped polyol with an excess of free isocyanate groups is reacted with a slurry comprising aggregate material, water, and any of various modifying agents such as blowing agents, promoters, accelerators, or other modifying ingredients.

The following U.S. patents, the disclosures of which are hereby incorporated by reference, provide examples of prior approaches to aggregate material consolidation with an urethane foam matrix.

Pruitt et al. U.S. Pat. No. 3,373,009 discloses a method of forming a nutrient plant growth medium from a urethane made by reacting a polyether of polyester compound and a diisocyanate for a period of between about 2 and 4 hours. The prepolymer is then mixed with an aqueous mixture of catalyst, plant nutrient, and selected modifying ingredients to produce a foam urethane polymer intimately incorporating the plant nutrients.

Kistner U.S. Pat. Nos. 3,805,531 and 3,805,532 describe a reaction scheme wherein a urethane prepolymer is formed by mixing a compound having a plurality of active hydrogen atoms, such as polyol, with a stoichiometric excess of an organic polyisocyanate or polyisothiocyanate compound at ambient temperature under essentially anhydrous conditions for a period of several days.

Wood et al. U.S. Pat. Nos. 3,812,619 and 4,241,537 describe a similar reaction conducted for period of about 6 hours.

Such prior methods of forming a urethane prepolymer ultimately used to produce a plant growth medium generally require rather lengthy reaction and/or aging (curing) periods.

One approach to overcoming the problem of the prior art is reflected in Dedolph U.S. Pat. No. 4,329,436 (May 11, 1982) wherein a prepolymer-forming reaction system utilizing reaction temperatures of greater than about 120° C. is disclosed. The inventive reaction of the above-identified Dedolph patent results in relatively viscous prepolymers which exhibit a high degree of cross linking, and which, as a result, upon reacting with water, form open celled, hydrophilic urethane polymers which undergo a minimum of initial expansion and minimal shrinkage following reaction. Such polymers provide enhanced binding ability when used to consolidate aggregate material.

SUMMARY OF THE INVENTION

It is an object of the present invention to overcome one or more of the problems described above.

In accordance with the invention, a liquid urethane prepolymer useful in the consolidation of aggregate material or in the production of high quality urethane foams is formed by conducting an exothermic condensation reaction between a hydrophilic polyether or a polyester compound and a stoichiometric excess of an isocyanate compound under controlled conditions. More specifically, the present invention contemplates an exothermic reaction between a hydrophilic polyether or polyester compound, preferably a polyol such as polyethylene glycol, under substantially anhydrous conditions. (It is to be understood that reference herein to the preferred polyol is not limiting, but is intended to apply to polyether or polyester reactants generally.)

The liquid isocyanate compound is relatively dense compared to the liquid polyol. According to the invention, the respective polyol and isocyanate compounds are introduced to a reactor with a minimum of mixing so as to form two distinct layers. The relatively dense isocyanate compound forms a layer underlying the relatively less dense polyol layer.

The liquid prepolymer of the invention has a relatively high viscosity which is indicative of a high degree of cross linking. As a result, it is believed that the prepolymer forms a partial gel matrix prior to the forming reaction of the prepolymer with water. This in turn results in early setting of the cellular polymer after reaction with water.

Also, relatively low carbon dioxide evolution during the reaction with water is experienced.

The foregoing factors contribute to a relatively low degree of expansion of the foam polymer upon reaction with water and, consequently, a lower degree of foam shrinkage after the reaction period.

When used to consolidate the aggregate materials, the binding ability of prepolymers and polymers made according to the invention is superior to those made with mixing of reactants. No aging or curing of the prepolymer prior to reaction with water or an aqueous slurry is required.

In addition to a decreased degree of initial expansion and subsequent shrinkage, it has been found that prepolymers and polymers made according to the invention exhibit a decreased variation in expansion and shrinkage. Also, the foam polymers exhibit increased strength after setting as compared to prior foams, as well as increased resistance in puncture or shear forces. Also, a lower variation in pot life is exhibited by polymer foams used to consolidate aggregate materials.

The rate of reaction may be controlled by control of the surface area and/or time of persistence of the interface between the relatively dense isocyanate compound layer and the overlying polyol layer. Control of the interface surface area may be effected by selection of an appropriately-shaped reaction vessel.

The reaction may be quenched if necessary by the addition of an excess of polyol. Subsequent addition of isocyanate compound permits the reaction to proceed after quenching and cooling. The reaction does not require reagent grade reactants.

The resulting liquid prepolymer is suitable for reaction with an aqueous slurry of aggregate material in order to form a polymeric matrix supporting the aggregate material. It has been found that the binding ability of the prepolymer is superior to the binding ability of urethane prepolymers made according to the prior methods.

Prepolymers made according to the invention require no aging or curing prior to reaction thereof with an aqueous aggregate slurry or with water.

Further objects and advantages of the invention will be apparent to those skilled in the art from the following detailed description taken in conjunction with the appended claims.

DETAILED DESCRIPTION OF THE PREFERRED EMBODIMENT

The present invention contemplates the formation of a hydrophilic liquid urethane prepolymer by an exothermic condensation reaction between a hydrophilic polyether or polyester compound and a stoichiometric excess of an organic polyisocyanate or polyisothiocyanate compound (collectively referred to herein as "isocyanate compound") under substantially anhydrous conditions. The reaction is initiated by addition, preferably without added mechanical mixing, of the isocyanate compound to a quantity of the water-free polyether or polyester compound.

The isocyanate compound is more dense than the polyether or polyester compound and thus forms a layer underlying a polyether/polyester layer. The rate of reaction may be controlled by control of the surface area of the interface between the respective isocyanate and polyether/polyester layers, as by use of an appropriately-shaped reaction vessel.

If desired, added mixing may be used to accelerate the reaction, but should not be used thereafter until after the reaction temperature has peaked and has begun to fall, and the reaction is known to be controllable.

A preferred means of accelerating the initiation of the reaction is recirculation of the isocyanate compound through the polyether/polyester layer, as described below.

The rate of reaction can be controlled by (1) the use of relatively small volumes of reactants, and/or (2) periodic quenching when the reaction temperature exceeds a predetermined maximum value by addition of anhydrous polyether or polyester, and subsequent addition of isocyanate to reinitiate the reaction after the reaction temperature has fallen to an acceptable level.

Dedolph U.S. Pat. No. 4,329,436 and copending application Ser. No. 350,946 filed Feb. 22, 1982 disclose the benefits obtainable by producing a hydrophilic urethane prepolymer by reacting, under substantially anhydrous conditions, an isocyanate compound with a hydrophilic polyether or polyester compound at reaction temperatures greater than about 120° C. Similar advantages are obtainable according to the invention utilizing reaction temperatures of 120° C. or less.

When layering of reactants is utilized, it has been found, surprisingly, that the physical characteristics of the resulting prepolymer, and cellular polymer foams made by reaction of the prepolymer with water, are enhanced.

The prepolymer obtained by the reaction may be reacted immediately with an aqueous slurry of unconsolidated aggregate material, or with water alone. Aging of the prepolymer is not required.

The liquid prepolymers of the invention are relatively viscous compared to prior prepolymers made at reaction temperatures of less than 120° C. without the benefit of layering of reactants. As such, these prepolymers exhibit a decreased degree of initial expansion upon foaming with water, as well as a decreased variation in expansion. As a result, cellular foams made from the prepolymer exhibit a relative decrease in the extent of shrinkage subsequent to foam formation.

Cellular foams made from the inventive prepolymer exhibit increased strength after setting, and enhanced resistance to puncture or shear forces, as well as a relatively low variation in pot life.

Prepolymer Formation

Polyether-Polyester Reactant

Any of a variety of polyether or polyester precursors useful in making urethane prepolymers may be used according to this invention. Suitable polyethers or polyesters include polyalkylene or polyoxyalkylene glycols or diols, including polybutylene glycol, polyethylene glycol (PEG), polypropylene glycol, polyoxyethylene glycerol, mixed polypropylene-polyethylene glycols, diethyleneglycol-adipic acid polyesters and caprolactone polyesters. Specific examples of suitable precursors include the poly-(oxyethylene-oxypropylene) polyols sold by BASF-Wyandotte under the trademark Pluronic, or those sold by Union Carbide Co. under the trademark NIAX, and hydrophilic polyols with heteric oxyethylene-oxypropylene chains. Preferred polyols are those hydrophilic or water soluble ethylene-or oxyethylene-containing polyols having molecular weights between about 1000 to 3000, although polyols having molecular weights below or above this range may be used is desired.

A highly preferred polyol is a polyethylene glycol (PEG) having a molecular weight of about 1000 and marketed by Union Carbide Co. under the trademark Carbowax 1000.

Isocyanate Compound

Polyisocyanates which can be used to prepare isocyanate-capped prepolymers according to this invention include aliphatic and aromatic polyisocyanates and polyisothiocyanates containing at least two active isocynate groups per molecule. Aromatic polyisocyanates are preferred because prepolymers made therefrom generally react relatively rapidly with water to form foam polymer.

A preferred polyisocyanate compound is tolylene diisocyanate (TDI). A preferred form of TDI is a blend sold by Olin Co. under the trade designation TDI-80 and comprising about 80 wt.% tolylene-2,4-diisocyanate and 20 wt.% tolylene-2,6-diisocyanate, although other blends of the 2,4 and 2,6 isomers are useful.

Reaction Conditions

Polyols such as the preferred Carbowax 1000 brand PEG are solids at 25° C. Therefore, the polyol should be moderately heated (e.g. 40°-60° C.) prior to initiation of the reaction. Since the reaction should be performed under substantially anhydrous conditions and since polyols used in the reaction are highly hydrophilic, it is generally preferred to "degas" (i.e. drive off any accumulated water) the polyol prior to initiation of the reaction. Degassing may be accomplished by heating the polyol to a temperature between about 175° C. and 260° C. for a period of between about 15-20 minutes. Although the polyol may be degassed at temperatures below 175° C., higher temperatures are preferred in order to accomplish the degassing in a convenient period of time. It should be noted, however, that exposure of PEG to temperatures above 175° C. for a sustained period of time results in darkening of the PEG, presumably through carburization. Such darkening does not have an adverse effect on the method of the invention.

Isocyanate may be stored at ambient temperatures, i.e. between about 20° C.-35° C. After introduction of a desired amount of polyol to a reaction vessel, a stoichiometric excess of isocyanate is carefully introduced to the vessel.

Isocyanate should be introduced to the reaction vessel with a minimum of added mechanical mixing. Since isocyanate is generally more dense than polyol, isocyanate may be introduced to the bottom of the reaction vessel in order to minimize mixing. Alternatively, isocyanate may be metered through the polyol layer, or isocyanate may be introduced to the vessel prior to introduction of polyol.

It may be necessary to provide some mixing immediately after isocyanate addition in order to initiate the reaction. One means of effectively increasing the area of the reactive interface is to circulate isocyanate from the bottom of the reactor to the polyol surface, preferably along the sides of the reactor. Thus, a relatively sluggish initial reaction may be accelerated in a highly controllable manner. After the reaction is initiated, the exothermicity of the reaction will be detected in the form of a rise of the reaction temperature. Recirculation of isocyanate through the polyol should be terminated before the reactants reach a predetermined temperature or the rate of reaction will be excessive.

The polyol-isocyanate reaction evolves isocyanate-containing gas. By adding isocyanate without mechanical mixing (except for reaction initiation) until the reaction is known to be under control, the amount of evolved isocyanate gas lost to the atmosphere is reduced, since any evolved gas must pass through the polyol layer, resulting in reaction of a substantial portion of the isocyanate in the evolved gas with polyol.

Addition of relatively cool isocyanate to polyol generally results in an initial drop of the reaction temperature. However, after the reaction is initiated, the reaction temperature rises sharply, peaks and falls after the exothermicity of the reaction is exhausted.

Temperatures within the reaction vessel should be continuously monitored, and maintained below a predetermined maximum value, as by quenching. For example, the boiling point of tolylene diisocyanate (TDI) is 251° C.; TDI temperatures should not be permitted to exceed about 235° C.

As the reaction proceeds, the effective polyol concentration decreases. Therefore, after a peak and initial drop in temperature, mechanical stirring will elicit no substantial additional exotherm, but added stirring may be employed in order to conclude the prepolymer formation reaction.

Reaction Vessel

The reaction between isocyanate and polyol occurs at the interface between the respective layers. The reaction is strongly exothermic, and the rate of reaction increases with increasing temperature. Therefore, it may, depending on initial reaction temperature, be advantageous to control the size of the interface between the layers, and thus the rate of reaction, by selection of a reaction vessel of appropriate shape. Furthermore, the reaction vessel should not be overly large, as the absolute amount of heat produced by the reaction increases with the mass of the reactant.

It is advantageous to use a reaction vessel having a selected, relatively narrow cross-section at its lower end, which accommodates a predetermined maximum amount of isocyanate. Thus, the size of the interface between the overlying polyol layer and the more dense isocyanate layer is controlled.

Should the reaction temperature rise to a predetermined maximum, rapid quenching of the reaction is readily effected by addition of cool, degassed polyol. The additional polyol rapidly reacts with free isocyanate groups in the reaction mixture. After the reaction mixture has cooled to a safe level, isocyanate may be introduced to reinitiate the polyol-isocyanate reaction.

Consolidation Of Aggregate Material

The urethane prepolymer formed as described above may be reacted with water in an aqueous slurry of various types of aggregate material to form a foam polymer matrix which supports the aggregate material. Alternatively, a high quality urethane foam may be produced by reaction of the prepolymer with water.

One especially advantageous aggregate material is peat. Other forms of organic residue or soil which can be consolidated along with nutrient materials to support plant growth include, but are not limited to, sewage sludge, compost, and clays.

The urethane prepolymers can be reacted with a peat-water slurry shortly after initiation of the polyol-isocyanate reaction to produce quick curing, strong soil plugs. The time lapse required depends on the time of reaction. Soil plugs made from the prepolymer of the invention are more thoroughly bound than soil plugs made with prepolymer produced by prior reactions involving mixing of reactants, and thus lesser amounts of prepolymer may be used to produce plugs of like strength.

The following Examples will illustrate production of a urethane prepolymer according to a preferred embodiment of the invention.

EXAMPLES

Reaction System

Cylindrical reaction vessels of about 635 ml volume (7 cm diameter, 16.5 cm deep) were fitted with gas-tight closures and appropriate tubulated venting. Two copper/constantan thermocouples were deployed along the central axis of the vessel: one 2.5 cm from the bottom of the vessel and the second above the first and 5 cm from the bottom of the vessel.

A tubulated access port was provided to permit the introduction of polyisocyanate into the bottom of the vessel. A rigid tube attached to the inside of the gas-tight lid terminated 1 cm from the bottom of the cylindrical vessel and was spaced about 1 cm from the side of the vessel when the vessel was sealed. The gas vent was attached through about 2 meters of 1 cm ID tubing to a graduated water displacement gas collection vessel.

When a reaction was to be performed with mixing, a glass encased stirring rod was included in the vessel and the vessel was placed upon a magnetic stirrer.

Reaction Procedure-Prepolymer Synthesis

Common stored (covered contained) polyethylene glycol (PEG 1000) was heated to 350° F. in an open container for at least 30 minutes. Then 400 g±0.1 g samples were weighed into each of two reaction vessels. Vessels were then capped but vented to the atmosphere and placed in a 375°±10° F. oil bath and reheated from about 300° F. to about 340°-350° F. They were then removed from the oil bath and permitted to cool to 325° F., at which time 140.4±0.01 g of tolylene diisocyanate (TDI) at 70° F. was added so it layered beneath the polyethylene glycol.

Pinch clamps on all ports were immediately closed and stirring was commenced in the reaction vessel designated "mixed".

When the temperature within a vessel had reached 200° F. and the reaction was deemed complete, vessels were removed from the reactor and sealed.

In the case of the layered reaction system, the reaction interface and mass were insufficiently great to sustain the reaction; so in the first two reaction tests, heat was added to the system intermittently until the reaction was complete. In the second two reaction tests, heat was applied to the system immediately after the TDI was added and the reaction was driven to completion as evidenced by the disappearance of the reactant interface, and the vessel was permitted to cool in air.

Reaction Procedure-Foaming

When the freshly reacted prepolymer had cooled to 120° F., the viscosity of the prepolymer was determined with a Brookfield Viscometer using a 20 RPM rotation rate and a No. 4 spindle.

At the completion of the viscosity determination, vessels were loosely sealed and placed in a boiling water bath for 1-2 hours, at which time the temperature of the prepolymer in the vessel reached a constant 165° F.

Two 75 ml samples of the prepolymer were then withdrawn from each of the two vessels and mixed with water at 70° F. Mixing was continued for 30 seconds, and two release-agent coated cylinders, 10 cm in height and 3.8 cm in diameter, were filled with this mixed material. After filling, a second release-agent coated cylinder of the same dimension was attached to the top of each of the poured cylinders and the time until expansion of the foam into the second cylinder had ceased was recorded.

Foam plugs were immediately removed from the cylinders, their lengths were measured, and they were subjected to a puncture pressure test by measuring the resistance to penetration of a cylindrical, 2.5 $cm^2$ face diameter plunger. The plunger was inserted at a constant speed of 0.68 cm/second. The shear points of three trials in each core formed as punched across the cylinder, i.e., along a diameter normal to the central axis of the cast plug, were recorded.

A third prepolymer sample was withdrawn from the reaction vessels and reacted with water as described above. This sample, placed in a plastic bag and sealed, was remeasured the next morning for shrinkage, i.e., foam collapse.

Experimental Design, Data Analysis, Experimental Safeguards and Basis of Interpretation All reactions were run as paired samples, that is, one mixed and one layered system, were reacted at a given time. The PEG was degassed in a common vessel and samples were withdrawn therefrom for each of the paired samples. The reaction system used was alternated for each successful reaction pair. Before any reaction was started, the system was checked for gas integrity; a corresponding check of gas integrity was made after the reaction was completed.

In every design feature of the experiments performed, random variation was directed to a residence between replicates, not within treatments.

Differences between means of data so obtained were subjected to analysis of variance. Where differences between more than two means were to be determined, appropriate multiple comparison tests were employed.

Results

The data thus obtained and so analyzed show that prepolymers synthesized with mixing during the prepolymer-forming reaction will be substantially lower in viscosity than those synthesized using a layering of the two reactants (Table 1).

When foams are formed using the prepolymers formed within mixing during synthesis as contrasted to those formed with layering of the two reactants during synthesis, marked differences in the physical characteristics of the plugs so formed are apparent.

Mixing reactants during prepolymer synthesis increases initial expansion and subsequent shrinkage of media, and decreases media strength after setting as compared to media produced from prepolymers synthesized with layering. Mixing reactants during prepolymer synthesis also increases variation in pot life and initial expansion as compared to corresponding samples synthesized with layering (Table 2).

Layering of reactants resulted in comparatively high resistance to puncture or shear forces (Table 2).

Foam samples prepared with mixing during prepolymer synthesis yielded about 86% of the expected evolved $CO_2$ and those produced with layering produced only about 69% of expected evolved $CO_2$ volume. With mixing during prepolymer synthesis, about 14.5% of the reactive cyanate groups were used in non-$CO_2$ yielding reactions, i.e., the formation of allophanate cross-linkages or anhydrous chain extension. With layering during the prepolymer synthesis 31.5% of the reactive cyanate groups were used in the formaton of allophanate cross-linkages and anhydrous chain extension.

It is apparent that the urethane prepolymers obtained from a given stoichiometric ratio of the polyisocyanate and polyol differ substantially in composition depending upon whether the reaction is performed with reactants mixed or layered. This difference in composition is reflected in different prepolymer viscosities and differing physical characteristics of the resultant foams.

It was also found that prepolymers of the invention had a higher viscosity at any given temperature than prepolymers made with mixing.

The prepolymers will react with soil slurries or with water along to produce open-celled, water-permeable hydrophilic elastomeric matrices having substantially different and advantageous characteristics than those produced by the prior art.

The foregoing detailed description is given for clearness of understanding only, and no unnecessary limitations should be understood therefrom, as modifications within the scope of the invention will be obvious to those skilled in the art.

TABLE 1

The influence of mixing of reactants during prepolymer synthesis upon viscosity of the prepolymer at the completion of the synthesis reaction.

| | | Reactants layered | |
|---|---|---|---|
| | Reactants mixed No heating after mixing | Intermittent heating | Continuous heating |
| Viscosity | 20.88a | 57.25b | 95.75c |
| Coefficient of variation | 24% | 12% | 4% |

Data, expressed in poise, are for freshly synthesized prepolymers at 49° C.
Means within a row not followed by the same letter differ at odds greater than 100:1 (Snedecor's "F" test criterion). Mean separation based upon Kramer's extension of Duncan's multiple range test.

TABLE 2

The influence of method of handling reactants during prepolymer synthesis upon subsequent behavior of the prepolymer in a foaming reaction with water.

| | Method of reacting | | |
|---|---|---|---|
| Factor measured | Mixed | Layered | Odds[1] |
| Seconds to set[2] | 126 | 63 | 40:1 |
| Coefficient of variation | 31% | 12% | |
| Initial expansion of foam | 85 | 68 | 100:1 |
| $\dfrac{\text{Set volume} - \text{Poured volume}}{\text{Poured volume}} \cdot 100$ | | | |
| Coefficient of variation | 23% | 12% | |
| Subsequent shrinkage of foam | 36.6 | 4.4 | 100:1 |
| $\dfrac{\text{Initial volume} - \text{Volume 12 hrs.}}{\text{Initial volume}} \cdot 100$ | | | |
| Coefficient of variation | 2% | 3% | |
| Puncture resistance Kg/Cm$^2$ | 1.284 | 1.536 | 100:1 |
| Coefficient of variation | 2% | 7% | |

[1]Means differ at odds of greater than stated (Snedecor's "F" test criterion).
[2]Seconds to set is time to full expansion of material after 30 seconds mixing and 10 seconds pouring.

TABLE 3

Carbon dioxide evolution during foaming of 25 g samples of prepolymers synthesized with layering and mixing methods.

| | Mixed | Layered Intermittently heated |
|---|---|---|
| $CO_2$, cc. STP | 145.38 | 109.99 |
| Coefficient of variation | 33% | 28% |

Means differ at odds greater than 19:1. Snedecor's "F" test criterion.

I claim:

1. A method of forming a urethane prepolymer, said method comprising the steps of:
   (a) adding to a polyether or polyester compound under substantially anhydrous conditions a stoichiometric excess of a compound containing at least two active isocyanate groups per molecule to initiate an exothermic condensation reaction between said polyether or polyester compound and said isocyanate compound, the temperature of said reactants being such that the temperature of the reactants after addition of isocyanate is less than or equal to about 120° C., the density of said isocyanate compound being greater than the density of said polyether or polyester compound and said isocyanate compound being added gradually to said polyether or polyester without substantial added mixing whereby a relatively dense isocyanate layer and a polyether or polyester layer overlying said isocyanate layer are formed; and,
   (b) allowing said reaction to proceed in order to form said urethane prepolymer.

2. The method of claim 1 wherein the surface area and/or time of persistence of the interface between said polyester or polyether layer and said isocyanate layer is controlled in order to control the rate and nature of reaction between said isocyanate compound and said polyether or polyester compound.

3. A urethane prepolymer prepared by the method comprising the steps of:
   (a) adding to a polyether or polyester compound under substantially anhydrous conditions a stoichiometric excess of a compound containing at least two active isocyanate groups per molecule to initiate an exothermic condensation reaction between said polyether or polyester compound and said isocyanate compound, the temperature of said reactants being such that the temperature of the reactants after addition of isocyanate is less than or equal to about 120° C., the density of said isocyanate compound being greater than the density of said polyether or polyester compound and said isocyanate compound being added gradually to said polyether or polyester without substantially adding mixing whereby a relatively dense isocyanate layer and a polyether or polyester layer overlying said isocyanate layer are formed; and,
   (b) allowing said reaction to proceed in order to form said urethane prepolymer.

4. A method of forming a cellular urethane polymer, said method comprising the steps of:
   (a) adding to a polyether or polyester compound under substantially anhydrous conditions a stoichiometric excess of a compound containing at least two active isocyanate groups per molecule to initiate an exothermic condensation reaction between said polyether or polyester compound and said isocyanate compound, the temperature of said reactants being such that the temperature of said reactants after addition of isocyanate is less than or equal to about 120° C., the density of said isocyanate compound being greater than the density of said polyether or polyester compound and said isocyanate compound being added gradually to said polyether or polyester without substantial added mixing whereby a relatively dense isocyanate layer and a polyether or polyester layer overlying said isocyanate layer are formed;
   (b) allowing said reaction to proceed in order to form a urethane prepolymer; and,
   (c) reacting said prepolymer with water to form said cellular urethane polymer.

5. The method of claim 4 wherein the surface area of the interface between said polyester or polyether layer and said isocyanate layer is controlled in order to control the rate of reaction between said isocyanate compound and said polyether or polyester compound.

6. A cellular urethane polymer prepared by the method comprising the steps of:
   (a) adding to a polyether or polyester compound under substantially anhydrous conditions a stoichiometric excess of a compound containing at least two active isocyanate groups per molecule to initiate an exothermic condensation reaction between said polyether or polyester compound and said isocyanate compound, the temperature of said reactants being such that the temperature of the reactants after addition of isocyanate is less than or equal to about 120° C. the density of said isocyanate compound being greater than the density of said polyether or polyester compound and said isocyanate compound being added gradually to said polyether or polyester without substantial added mixing whereby a relatively dense isocyanate layer and a polyether or polyester layer overlying said isocyanate layer are formed;

(b) allowing said reaction to proceed in order to form a urethane prepolymer; and, (c) reacting said prepolymer with water to form said cellular urethane polymer.

7. A method of consolidating aggregate material to form an integral, resilient, water-permeable mass, said method comprising the steps of:

(a) adding to a polyether or polyester compound under substantially anhydrous conditions a stoichiometric excess of a compound containing at least two active isocyanate groups per molecule to initiate an exothermic condensation reaction between said polyether or polyester and said isocyanate compound, the temperature of said reactants being such that the temperature of the reactants after addition of isocyanate is less than or equal to about 120° C., the density of said isocyanate compound being greater than the density of said polyether or polyester compound and said isocyanate compound being added gradually to said polyether or polyester without added mixing whereby a relatively dense isocyanate layer and a polyether or polyester layer overlying said isocyanate are formed;

(b) allowing said reaction to proceed in order to form a urethane prepolymer;

(c) forming an aqueous slurry of unconsolidated aggregate material; and, (d) combining said slurry and said prepolymer whereby the water in said slurry reacts with said prepolymer to form a cellular polymer which binds said aggregate material.

8. The method of claim 7 wherein the surface area of the interface between said polyether or polyester layer and said isocyanate layer is controlled in order to control the rate of reaction between said isocyanate compound and said polyether or polyester compound.

9. A consolidated aggregate material in the form of an integral, resilient, water-permeable mass prepared by the method comprising the steps of:

(a) adding to a polyether or polyester compound under substantially anhydrous conditions a stoichiometric excess of a compound containing at least two active isocyanate groups per molecule to initiate an exothermic condensation reaction between said polyether or polyester and said isocyanate compound, the temperature of said reactants being such that the temperature of the reactants after addition of isocyanate is less than or equal to about 120° C., the density of said isocyanate compound being greater than the density of said polyether or polyester compound and said isocyanate compound being added gradually to said polyether or polyester without substantial added mixing whereby a relatively dense isocyanate layer and a polyether or polyester layer overlying said isocyanate layer are formed;

(b) allowing said reaction to proceed in order to form a urethane prepolymer;

(c) forming an aqueous slurry of unconsolidated aggregate material; and, (d) combining said slurry and said prepolymer whereby the water in said slurry reacts with said prepolymer to form a cellular polymer which binds said aggregate material.

* * * * *